United States Patent
Farou et al.

[11] Patent Number: 5,760,505
[45] Date of Patent: Jun. 2, 1998

[54] APPARATUS AND METHOD FOR INTRODUCING WIRE SLACK IN STATOR WINDINGS

[75] Inventors: Adnan M. Farou, Hartville; Robert L. Hyatt, Sr., Munroe Falls, both of Ohio

[73] Assignee: Ametek, Inc., Kent, Ohio

[21] Appl. No.: 645,922

[22] Filed: May 14, 1996

Related U.S. Application Data

[63] Continuation of Ser. No. 334,946, Nov. 7, 1994, abandoned.

[51] Int. Cl.[6] .......................... H02K 11/00; H02K 15/09
[52] U.S. Cl. ................................................ 310/71; 242/432
[58] Field of Search .................................. 242/1.1 R, 432; 29/596, 598, 735; 310/71, 194, 198

[56] References Cited

U.S. PATENT DOCUMENTS

| | | | |
|---|---|---|---|
| 4,074,418 | 2/1978 | Pearsall | 29/596 |
| 4,142,289 | 3/1979 | Roethke | 29/736 |
| 4,584,498 | 4/1986 | Strobl | 310/236 |
| 4,656,380 | 4/1987 | Strobl | 310/236 |
| 4,969,606 | 11/1990 | Santandrea et al. | 242/1.1 R |
| 4,991,782 | 2/1991 | Luciani | 242/1.1 R |
| 5,331,240 | 7/1994 | Hyodo | 310/71 |
| 5,535,503 | 7/1996 | Newman | 29/596 |

FOREIGN PATENT DOCUMENTS

| | | |
|---|---|---|
| 2-21443 | 2/1990 | Japan . |
| 2-174530 | 7/1990 | Japan . |
| 6-178481 | 6/1994 | Japan . |

*Primary Examiner*—Steven L. Stephan
*Assistant Examiner*—Michael J. Wallace, Jr.
*Attorney, Agent, or Firm*—Renner, Kenner, Greive, Bobak, Taylor & Weber

[57] ABSTRACT

An apparatus and method is provided for introducing slack into a coil wire prior to termination. A stator having a volume of coil windings has a terminal board mounted thereon. Means for introducing slack in the coil wire includes a terminal receiving cavity located in the terminal board. A portion of the coil wire is passed across the cavity and a terminal is inserted therein, thereby crimpingly engaging the wire. The wire is simultaneously passed over a spacer which extends laterally across the cavity. When the spacer is subsequently removed a loop of slack remains in the wire.

9 Claims, 2 Drawing Sheets

APPARATUS AND METHOD FOR INTRODUCING WIRE SLACK IN STATOR WINDINGS

This is a continuation of application Ser. No. 08/344.946 filed Nov. 7, 1994 now abandoned.

TECHNICAL FIELD

The invention herein resides in the art of dynamoelectric machines, such as motors and generators. More particularly, the invention relates to methods and apparatus for winding and terminating coil wires for such machines. Specifically, the invention relates to a method and device for introducing slack into such coil wires prior to termination.

BACKGROUND ART

For many years it has been known to wind coil wire on electric motor stators by using automated winding machinery. In recent years various methods have been implemented for terminating such wires at the terminal board. A commonly known method for terminating such wires has been to pass the coil wire across a terminal receiving cavity in the terminal board and to insert a terminal into the cavity. The terminal insertion process serves to both, establish an electrical connection between the wire and the terminal and to cut the wire at the terminal. However, it has been found that the insertion of the terminal tends to pull the coil wire taut between the winding and the terminal. This results in increased wire breakage, particularly in end use applications. It has, therefore, been deemed desirable to introduce a small amount of slack in the coil wire just prior to termination, to ensure a proper connection, without an increased likelihood of breakage. Unfortunately, the nature and complexity of present winding equipment is not conducive to the introduction of slack. The task of modifying present winding equipment to introduce slack into the wire would be monumental, if not impossible. There is clearly a need for a method and device for introducing slack in a coil wire without significant changes to present winding processes and/or equipment.

DISCLOSURE OF INVENTION

In light of the foregoing, it is an aspect of the invention to provide a means for introducing slack into a coil wire prior to termination.

Another aspect of the invention is the provision of such a means which permits the use of existing winding equipment and processes without major modification thereto.

Yet an additional aspect of the invention is the provision of such means in conjunction with the terminal board without additional parts or manufacturing steps.

A further aspect of the invention is the provision of such a means which is easy to utilize and inexpensive to implement and maintain.

The foregoing and other aspects of the invention which will become apparent as the detailed description proceeds are achieved by an improved dynamoelectric device having a stator, a terminal board mounted on the stator, a volume of wire wound on the stator, wherein the improvement comprises means for introducing a loop of slack in the coil wire prior to termination at the terminal board.

Other aspects of the invention are achieved by a device for introducing wire slack in stator winding comprising: a terminal board having a curvilinear interior wall; a terminal receiving cavity in said terminal board; a spacer protruding from said interior wall of said terminal board across said terminal receiving cavity; a coil wire passing across said terminal receiving cavity; and a terminal received in said terminal receiving cavity of said terminal board; whereby said terminal engages said coil wire and said terminal receiving cavity and said coil wire is looped over said spacer so that when said spacer is removed said wire is maintained with a loop of slack.

Still other aspects of the invention are achieved by a method for introducing slack in a coil wire comprising the steps of: winding a volume of coil wire around cleats disposed within a stator; passing the coil wire across a terminal receiving cavity of a terminal board mounted on the stator; inserting a terminal into the terminal receiving cavity so as to crimpingly engage the coil wire; looping the coil wire over a laterally projecting spacer; and removing the spacer so as to provide a loop of slack in the coil wire.

DESCRIPTION OF THE DRAWINGS

For a complete understanding of the objects, techniques and structure of the invention, reference should be made to the following detailed description and accompanying drawings wherein.

BEST MODE FOR CARRYING OUT THE INVENTION

Figure 1:
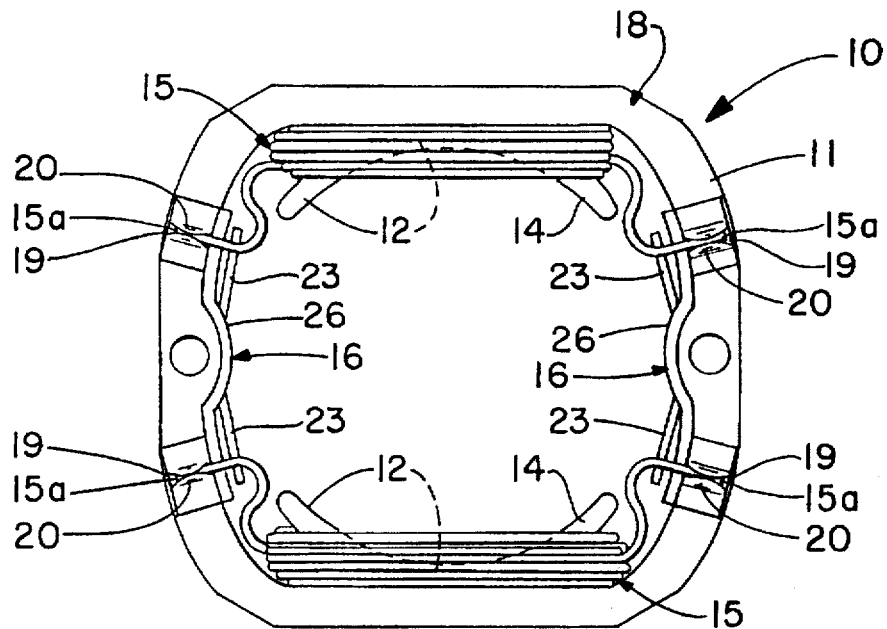
FIG. 1 is an elevational end view of a device embodying the concepts of the present invention.

Referring now to the drawings and more particularly to FIG. 1, it can be seen that a motor stator according to the invention is designated generally by the numeral 10. While it will be appreciated that the concept of the invention is applicable to any dynamoelectric device having coil windings, the description herein will be with respect to a stator of the nature shown. In such a device, the stator 10 is comprised of a plurality of stacked lamination plates 11 each having a pair of opposed curvilinear cleats 12 protruding inwardly. Accordingly, when the laminations 11 are assembled together to form the stator 10, the individual cleats 12 form a pair of opposed coil cleats 14 upon which are wound the stator coil wires 15. One or more terminal boards 16 may be mounted on the end face 18 of the stator 10.

The terminal boards 16 are preferably molded from an appropriate thermoplastic or other suitable material. As can be seen, each terminal board 16 includes one or more terminal receiving cavities 19. The terminal receiving cavities 19 are adapted to receive conventional electrical contact terminals 20. Typically, as the stator 10 passes through the manufacturing process, winding machinery winds the coil wires 15 around the coil cleats 14. After a number of coil wires 15 are wound to produce the necessary coils, the wire ends 15a are passed across the terminal receiving cavities 19. The manufacturing equipment then inserts a terminal 20 into the terminal receiving cavity 19. The rather tight interference fit between the terminal receiving cavity 19 and the terminal 20 serves to maintain the terminal 20 within the cavity 19. Further, the configuration of each terminal 20 is such that as a terminal 20 is pressed into the cavity 19, the terminal 20 crimps the wire end 15a which has been passed across the cavity 19.

Thus, electrical contact is established between the coil windings and the terminal 20. As the terminal 20 is being pressed into the cavity 19, the wire end 15a is severed by way of an appropriate knife (not shown) typically mounted in proximity to the terminal insertion tool (not shown).

Figure 2:
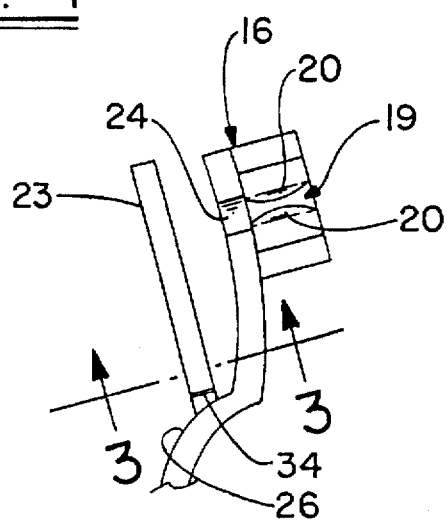
FIG. 2 is an elevational view, greatly enlarged, showing a portion of the terminal board and spacer.
Figure 3:
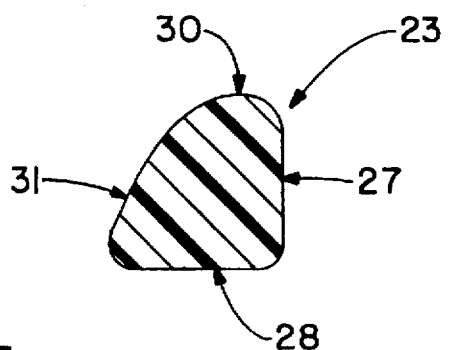
FIG. 3 is a cross section of the spacer of FIG. 2 taken along the line 3—3.
Figure 4:
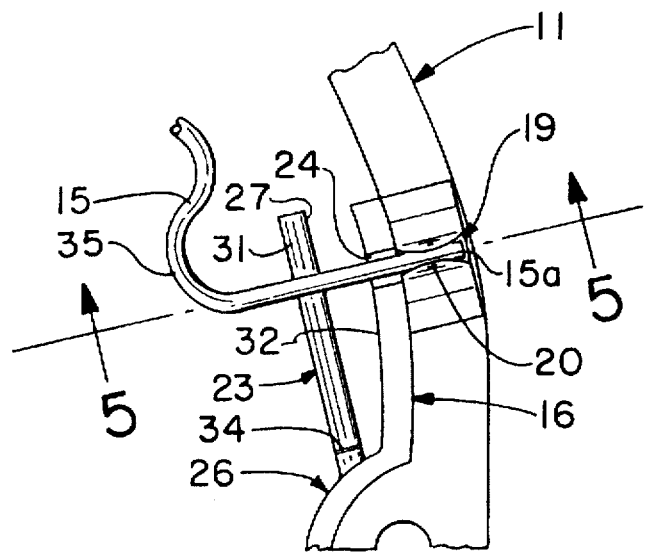
FIG. 4 is an enlarged portion of a terminal connection as shown in FIG. 1.
Figure 5:
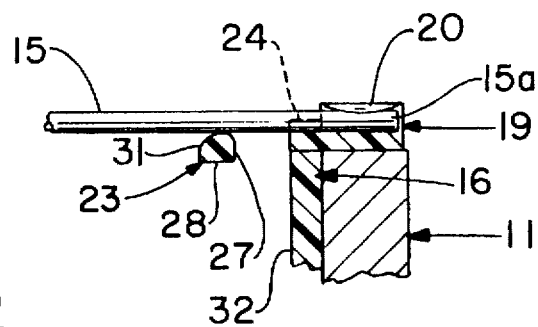
FIG. 5 is a an end view of the terminal connection of FIG. 4 taken along the line 5—5.

Those skilled in the art should now recognize that the means used for inserting the terminal 20 in the cavity 19 and establishing electrical connection between the terminal 20 and the wire 15 tends to stretch and strain the already tight wire 15. The taut nature of such connections tends to increase the incidence of wire breakage at or near the terminal 20, when the already stressed wire 15 is subjected to the additional stresses of end use applications. Such breakage is costly and tedious to repair. To remedy this problem the present invention includes a rod-like spacer 23 which is integrally molded with the terminal board 16. Referring now also to FIG. 2, the spacer 23 projects from a curvilinear interior wall 26 of the terminal board and extends laterally across wire slot 24 which communicates with the terminal receiving cavity 19. FIG. 3 illustrates a preferred cross section for the spacer 23. As can be seen, the rearmost surface 27 of the spacer 23 is substantially flat. It is this rearmost surface 27 which is adjacent to the terminal receiving aperture 19. A lower surface 28 is roughly 90° to the rearmost surface 27, however, the corner is softened by utilizing an appropriate radius. Similarly, a somewhat larger radius is used to form an upper surface 30 which joins the rear surface 27 and an angled front surface 31, which in turn joins the lower surface 28. Thus, the cross section of the spacer 23 provides a firm yet smooth surface over which the wire 15 is looped when a terminal 20 is inserted in a cavity 19. As is best depicted in FIGS. 4 and 5 the spacer 23 is interposed between the coil wire 15 and the interior face 32 of the terminal board 16. As such, the insertion of a terminal 20 in a cavity 19 causes the wire 15 to loop over the spacer 23. The spacer 23 is provided with a notch 34 proximal to the interior wall 26 of the terminal board 16. The notch 34 is included to facilitate removal of the spacer 23 after connection has been established between the terminal 20 and the wire 15. The spacer 23 may be removed by utilizing an appropriate tool (not shown) to sever the spacer 23, at the notch 34, either simultaneously with or immediately after the terminal 20 is inserted in a cavity 19.

It should now be recognized that after the spacer 23 is removed a small loop 35 remains in the wire 15 adjacent to the terminal 20. The loop 35 provides the necessary slack in the coil wire 15 to relieve the stress which leads to breakage in end use applications. It should further be recognized that the present invention may be utilized with existing winding machinery and processes with little or no modification. It is only necessary to modify the molds or tooling used to manufacture the terminal boards 16 so as to include the removable spacer 23.

Thus, it should be clear that the present invention succeeds in providing an apparatus employing structure that allows slack to be introduced in a coil wire prior to termination. Use of the foregoing apparatus facilitates the method of the present invention which is practiced by: winding an appropriate volume of coil wire around cleats disposed within a stator; passing the coil wire across a terminal receiving cavity of a terminal board mounted on the stator; inserting a terminal into the terminal receiving cavity so as to crimpingly engage the coil wire, while simultaneously looping the coil wire over a laterally projecting spacer; and removing the spacer so as to provide a loop of slack in the wire prior to termination. Although not shown or discussed herein, it should be apparent to those skilled in the art that the apparatus of the present invention could be practiced with a spacer having a variety of different cross sections and/or configurations.

Thus, it can be seen that the objects of the invention have been satisfied by the structure and method presented above. While in accordance with the patent statutes, only the best mode and preferred embodiment of the invention has been presented and described in detail, it is to be understood that the invention is not limited thereto or thereby. Accordingly, for an appreciation of the true scope and breadth of the invention reference should be made to the following claims.

What is claimed is:

1. An improved dynamoelectric device comprising:
   a stator;
   at least one coil wire wound on said stator;
   a terminal board mounted on said stator for receiving terminals connected to said at least one coil wire; and
   means for introducing a loop of slack in said coil wire prior to termination at said terminal board, said means for introducing being integral with and extending from said stator and said loop of slack being introduced during winding of the coil wire.

2. An improved dynamoelectric device according to claim 1 wherein, said means for introducing a loop of slack in the coil wire comprises:
   a terminal receiving cavity in the terminal board;
   a spacer protruding from the terminal board laterally across said terminal receiving cavity;
   a terminal received in said cavity; and
   a coil wire from the coil windings passing across said terminal receiving cavity;
   whereby said terminal crimpingly engages said coil wire and said coil wire is looped over said spacer and said spacer is thereafter removed leaving a loop of slack in said coil wire.

3. An improved dynamoelectric device according to claim 2 wherein, said spacer comprises a rod-like protrusion extending laterally from a wall of said terminal board.

4. An improved dynamoelectric device according to claim 3 wherein, said spacer further comprises:
   a substantially flat first surface adjacent to said terminal receiving cavity;
   a second surface generally orthogonal to said first surface;
   a third surface extending angularly from said first surface; and
   a curved fourth surface joining said second surface with said third surface whereby said first, second, third and fourth surfaces provide a smooth face over which said coil wire is looped.

5. An improved dynamoelectric device according to claim 3, wherein said spacer further comprises a notch proximal to said wall of said terminal board, said notch adapted facilitate removal of said spacer.

6. A motor stator which provides wire slack in stator windings comprising:
   a stator;
   a terminal board having a curvilinear interior wall, said terminal board extending from said stator;
   a terminal receiving cavity in said terminal board;
   a spacer protruding from said curvilinear interior wall of said terminal board across said terminal receiving cavity; and a terminal received in said terminal receiving cavity of said terminal board;

whereby said terminal engages said coil wire and said terminal cavity, and said coil wire is looped over said spacer so that when said spacer is removed said wire is maintained with a loop of slack.

7. The motor stator according to claim 6 wherein, said spacer comprises a rod-like protrusion extending laterally from a wall of said terminal board.

8. The motor stator according to claim 7 wherein, said spacer further comprises:

a substantially flat first surface adjacent to said terminal receiving cavity;

a second surface generally orthogonal to said first surface;

a third surface extending angularly from said first surface; and a curved forth surface joining said second surface with said third surface; whereby said first, second, third and fourth surfaces provide a smooth face over which said coil wire is looped.

9. The motor stator according to claim 7, wherein said spacer further comprises a notch proximal to said wall of said terminal board, said notch adapted to facilitate removal of said spacer.

* * * * *